United States Patent
Yoshii et al.

(10) Patent No.: US 7,133,379 B2
(45) Date of Patent: Nov. 7, 2006

(54) WIRELESS COMMUNICATION SYSTEM, AND BASE STATION APPARATUS AND COMMUNICATION TERMINAL APPARATUS ACCOMMODATED IN THE SYSTEM

(75) Inventors: Isamu Yoshii, Yokosuka (JP); Osamu Kato, Yokosuka (JP); Kenichi Miyoshi, Yokohama (JP); Atsushi Sumasu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1024 days.

(21) Appl. No.: 10/181,349

(22) PCT Filed: Nov. 27, 2001

(86) PCT No.: PCT/JP01/10307

§ 371 (c)(1),
(2), (4) Date: Jul. 17, 2002

(87) PCT Pub. No.: WO02/45455

PCT Pub. Date: Jun. 6, 2002

(65) Prior Publication Data

US 2003/0022672 A1  Jan. 30, 2003

(30) Foreign Application Priority Data

Nov. 29, 2000 (JP) .............................. 2000-363649

(51) Int. Cl.
*H04Q 7/00* (2006.01)
*H04Q 7/20* (2006.01)
*H04B 7/216* (2006.01)
*H04B 7/212* (2006.01)

(52) U.S. Cl. ...................... 370/328; 370/335; 370/342; 370/348; 455/450

(58) Field of Classification Search ...................... None
See application file for complete search history.

(56) References Cited

U.S. PATENT DOCUMENTS

| | | | | |
|---|---|---|---|---|
| 5,949,772 | A * | 9/1999 | Sugikawa et al. | 370/331 |
| 6,052,594 | A * | 4/2000 | Chuang et al. | 455/450 |
| 6,665,284 | B1 * | 12/2003 | Tran et al. | 370/334 |
| 6,747,964 | B1 * | 6/2004 | Bender | 370/335 |
| 6,968,182 | B1 * | 11/2005 | Kim | 455/418 |

FOREIGN PATENT DOCUMENTS

| | | |
|---|---|---|
| JP | 2001518766 | 4/1999 |
| JP | 11285048 | 10/1999 |
| WO | 9916266 | 4/1999 |

OTHER PUBLICATIONS

International Search Report dated Mar. 5, 2002.

(Continued)

*Primary Examiner*—Wellington Chin
*Assistant Examiner*—Melanie Jagannathan
(74) *Attorney, Agent, or Firm*—Stevens, Davis, Miller & Mosher, LLP (57) ABSTRACT

In a communication system that combines HDR system and IS-2000 system, when mobile station 101 receives an interruption request from IS-2000 system while performing high-speed packet communication system under HDR system, BTS 105 modifies priority of MS 101 higher than when there is no interruption request and assigns communication resources accordingly. By thus adequately operating HDR system and IS-2000 system, it is possible to offer a wireless communication system that efficiently combines the services of both systems, as well as a base station apparatus and a communication terminal for use in the system.

12 Claims, 7 Drawing Sheets

OTHER PUBLICATIONS

"HDR Air Interface Physical Layer", QUALCOMM Incorporated, Feb. 18, 2000, pp. 1-35.

Supplementary European Search Report dated Jan. 13, 2003 with copy of communication transmitted on Mar. 26, 2003.

3GPP GSM UMTS GPRS: "GPRS Service description stage 2 TS 23.060 v 3.5.0 Release 1999," ETSI TS 123 060 V3.5, Oct. 2000, XP002223529, Digital cellular telecommunications system (Phase 2+)(GSM); Universal Mobile Telecommunications System (UMTS); General Packet Radio Service (GPRS); pp. 1-182.

QUALCOMM: "1xEV: 1xEV Evolution IS-856 TIA/EIA Standard Airlink Overview Revision 7.2," QUALCOMM Whitepapers, Nov. 7, 2001, pp. 1-27, XP002223530.

* cited by examiner

FIG.1

RELATED ART

WIRELESS COMMUNICATION SYSTEM, AND BASE STATION APPARATUS AND COMMUNICATION TERMINAL APPARATUS ACCOMMODATED IN THE SYSTEM

TECHNICAL FIELD

The present invention relates to a wireless communication system that combines HDR system and IS-2000 system, and to a base station apparatus and a communication terminal accommodated in the system.

BACKGROUND ART

One example of multiple access protocols whereby a number of communication apparatus mutually performs communication is CDMA (Code Division Multiple Access) that uses the spread spectrum technology. CDMA excels in terms of privacy protection and interference resistance, and, with frequency efficiency that is high, is capable of accommodating a large number of users. The CDMA protocol has a history of standardization upon the basis of speech data transmission, and the transmission speed per channel assigned to each communication terminal is set at an adequate speed for speech data transmission. The IS-2000 system provides services for transmitting at relatively low rates data which requires to be transmitted in real time (in other words, which does not permit delay) such as speeches, and data which does not require to be transmitted in real time such as low-rate packets.

However, a need for transmitting large-volume data on forward link channels has grown with the development of services in variety in recent years. To meet this need, HDR (High Data Rate) has been proposed as a technique to enhance transmission rates on forward link channels from base stations to communication terminals. A communication system with HDR (hereinafter "HDR system") uses a wireless transmission scheme that does not require transmit power control, and, by means of using the same frequency bandwidths as those of IS-2000 system (1.25 MHz band) on both reverse link and forward link channels and performing transmission at a constant transmit power on forward link channels, implements the services of high-speed packet communication in the same covered area with IS-2000 system.

Generally, a wireless channel for high-speed packets has high symbol rates and requires greater transmit power than a wireless channel with relatively low symbol rates. Maintaining the wireless channels for high-speed packets therefore requires considerably great transmit power, and as a result, wireless channels for high-speed packets become great interference and a cause of a decrease in the system capacity.

Figure 1:
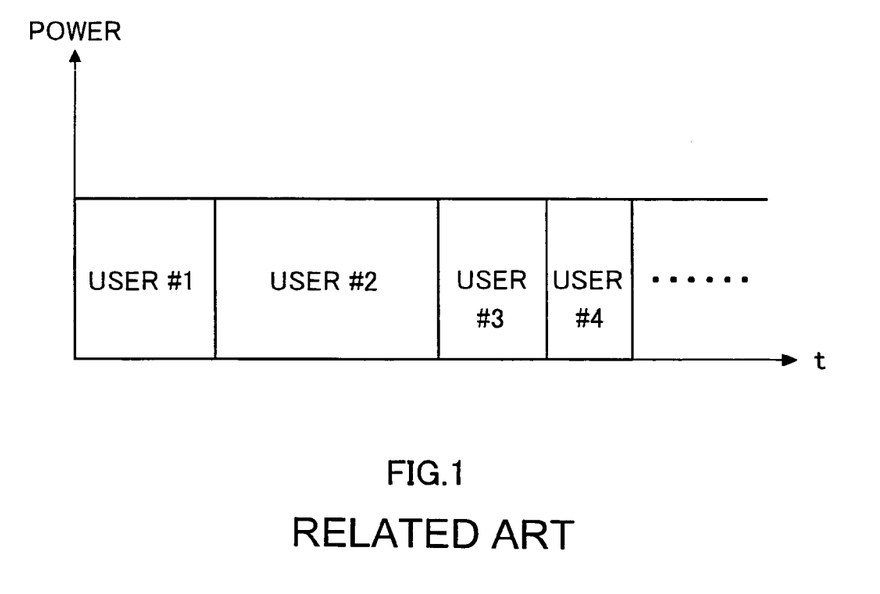
FIG. 1 shows a diagram describing an assignment of transmit slots for each user, and the transmit power.
Figure 2:
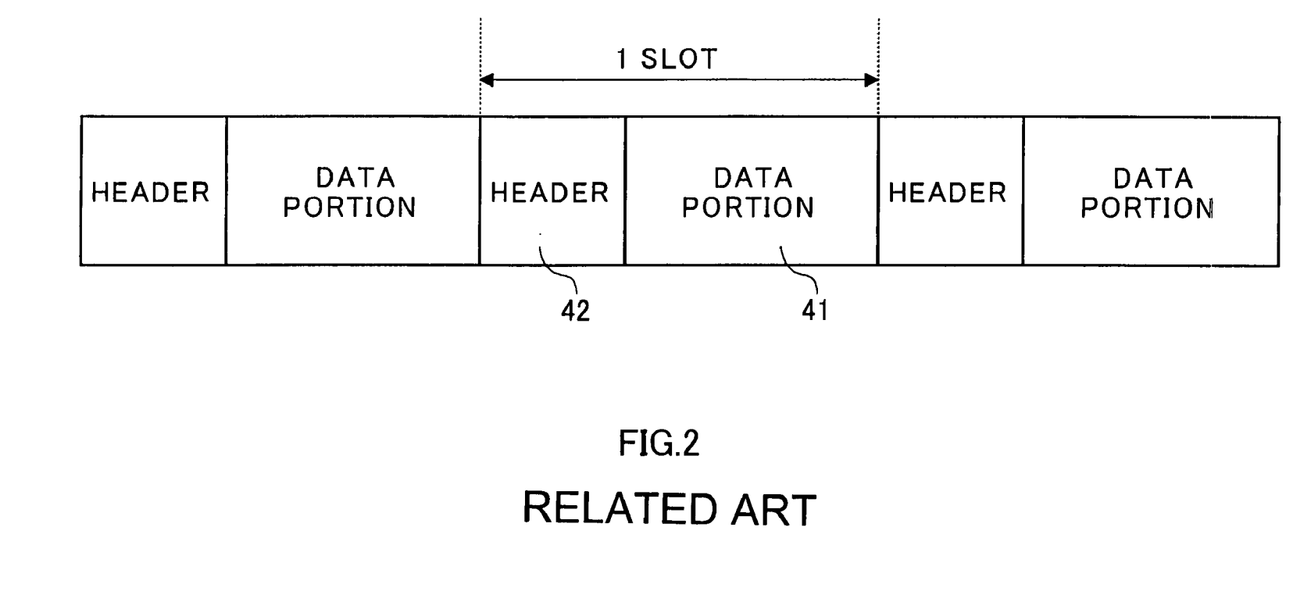
FIG. 2 shows a sample configuration of a transmit packet used in HDR system.

To solve this problem, HDR system assigns communication resources in accordance with the channel quality while performing transmission at a constant transmit power on forward link channels. As shown in FIG. 1, communication is performed with each user at a constant transmit power, while the communication mode including the slot length, coding rate, modulation scheme, and spreading factor vary corresponding to the channel quality of individual users. As one way of assigning communication resources like increasing transmission rates with users with a good-quality channel, the enhancement of the overall system by means of controlling the slot length, coding rate, modulation scheme, and spreading factor is presently under consideration. In FIG. 2, channel quality is good with user 2, and a large number of slots are assigned accordingly to the data for user 2.

High-speed packet communication performed between base stations and communication terminals in HDR system will be described now. FIG. 2 shows a sample configuration of a transmit packet used in HDR system. As shown in FIG. 2, a packet used in HDR system is comprised of slots each with data portion 41 on which data for users are time-multiplexed and with header 42 containing a pilot signal and control information added before data portion 41. The control information contains assignment information that denotes the assignment of communication resources for each communication terminal.

First, a base station transmits a packet configured as shown in FIG. 2 to each communication terminal in its own covered area. Each communication terminal measures the forward link channel quality (CIR (Carrier to Interference Ratio), for instance) based on the pilot signal contained in a received signal. Each communication terminal stores a table that denotes correspondence between forward link channel qualities and the best communication schemes for packet transmission with these channel qualities. Each communication terminal refers to this table and selects a communication scheme that enables the most efficient high-speed packet communication with the measured channel quality. A communication mode refers to a combination of the slot length assigned to transmit data, coding rate, modulation scheme, and spreading factor for transmit data. Each communication terminal transmits signals (Data Rate Control Signals: DRC signal) that denote selected communication scheme to the base station. Other communication terminals accommodated under the same base station similarly transmit DRC signals to the base station.

A base station refers to the DRC signals transmitted from each communication terminal and assigns communication resources, whereupon priority is given to communication terminals with good channel quality. By this means, data is transmitted at high transmission rates to communication terminals with good channel quality so that it is possible to reduce the time required for communication, while data is transmitted at low transmission rates to communication terminals with poor channel quality so that it is possible to improve error resistance. Incidentally, determining the assignment of transmit slots in accordance with the channel quality at a base station under HDR system is called "scheduling."

A base station assigns slots to transmit data in accordance with the communication resource assignment and performs decoding processing, modulation processing, and spreading processing with respect to the transmit data. A transmit frame is configured when transmit data for each communication terminal is time-division-multiplexed after the above processing. A transmit frame is transmitted to each communication terminal, whereupon the control information (assignment information) that denotes the assignment of communication resources with each communication terminal is inserted into a header at ahead of a transmit frame. A communication terminal learns the communication scheme by referring to the assignment information and is able to demodulate the data for the communication terminal.

The conventional HDR system enhances data transmission efficiency of the overall system by thus prioritizing communication terminals with good channel quality and by assigning communication resources accordingly.

In recent years, however, the construction of a communication system that combines HDR system and IS-2000 system by means of assigning frequencies that are different from those of IS-2000 system to the above-mentioned HDR system has been proposed. Services that this communication system combining HDR system and IS-2000 system offers (abbreviated "1xHDR/IS-2000") combine the high-speed packet communication services offered by HDR system and the speech communication services offered by IS-2000 system. With 1xHDR/IS-2000, HDR system and IS-2000 system can be switched at the user's choice using one communication terminal, whereby a variety of services can be provided.

However, HDR system and IS-2000 system are communication systems that are originally constructed upon different basis. When it comes to the services (1xHDR/IS-2000) that a communication system combining these systems offer, a problem arises that the consistency between the services of these systems may be incomplete and therefore both systems cannot operate efficiently. More specifically, when a communication terminal performing high-speed packet communication in HDR system receives a call under IS-2000 system, and when communication under IS-2000 system thus interrupts high-speed packet communication under HDR system, the following problems arise:

(1) When an interruption occurs and high-speed packet communication under HDR system is prioritized, the calling user has no choice but wait after a call from IS-2000 system until high-speed packet communication under HDR system is finished and communication starts under IS-2000 system, which deteriorates the transmission efficiency of the overall system. Furthermore, the communication terminal the calling user uses continues calling constantly even during the waiting period, and the power consumption of the communication terminal increases.

(2) When there is an interruption and high-speed packet communication is suspended before completion and communication under IS-2000 system is prioritized, the data in high-speed packet communication needs to be transmitted again, which consumes communication resources and increases the power consumption.

DISCLOSURE OF INVENTION

The present invention focuses upon the above problems with the object of providing a wireless communication system, as well as a base station apparatus and a communication terminal for use in the system, that efficiently combines and offers the services of both systems by adequately operating HDR system and IS-2000 system.

The above object is achieved as follows: When a communication terminal performing high-speed packet communication in the HDR system in a wireless communication system that combines an HDR system and an IS-2000 system receives an interruption request from the IS-2000 system, priority of the communication terminal in respect to which an interruption request is made is modified higher than when there is no interruption request and communication resources are assigned accordingly. By this means, it is possible to reduce the waiting time before communication under IS-2000 system starts by finishing high-speed packet communication in less time than when there is no interruption request from the IS-2000 system and by starting communication under the IS-2000 system after high-speed packet communication is finished.

Furthermore, the above object is achieved as follows: When a communication terminal performing high-speed packet communication in the HDR system in the above communication system receives an interruption request from the IS-2000 system, the HDR system suspends packet communication with the communication terminal in respect to which an interruption request is made from the IS-2000 system, and the IS-2000 system starts communication with the communication terminal in respect to which an interruption request is made. The HDR system resumes packet communication with the communication terminal in respect to which an interruption request is made after communication under the IS-2000 system is finished, and the data that was unsent when packet communication was suspended alone is transmitted by way of packet transmission. By this means, it is possible to reduce the waiting time before communication starts under the IS-2000 system.

Moreover, the above object is achieved as follows: When a communication terminal performing high-speed packet communication in the HDR system in the above communication system receives an interruption request from the IS-2000 system, the HDR system suspends packet communication with the communication terminal in respect to which an interruption request is made from the IS-2000 system. The IS-2000 system starts services for the communication terminal in respect to which an interruption request is made and transmits the data, that is for the communication terminal in respect to which an interruption request is made and which the HDR system holds, by way of inserting the data into an empty slot on a wireless channel assigned to the IS-2000 system. By this means, it is possible to reduce the waiting time before communication starts under the IS-2000 system.

The above-mentioned HDR system is an example of a wireless communication system (first wireless communication system) that performs packet communication at a relatively high transmission rate by assigning communication resources to the communication terminals accommodated under the system and by transmitting transmit packets generated in accordance with this assignment to all communication terminals accommodated under the system with same transmit power. In contrast, the IS-2000 system is an example of a wireless communication system (second wireless communication system) that performs wireless communication at a lower transmission rate than the first wireless communication system.

BEST MODE FOR CARRYING OUT THE INVENTION

The embodiments of the present invention will be described in detail with reference to the accompanying drawings. With respect to IMT-2000, which is a third-generation mobile communication system and the standardization process of which by ITU is currently in progress, high-speed data transmission services using IP (Internet Protocol) packets are given much significance, and so packets in the wireless communication systems according to the present embodiments are also IP packets.

Embodiment 1

Figure 3:
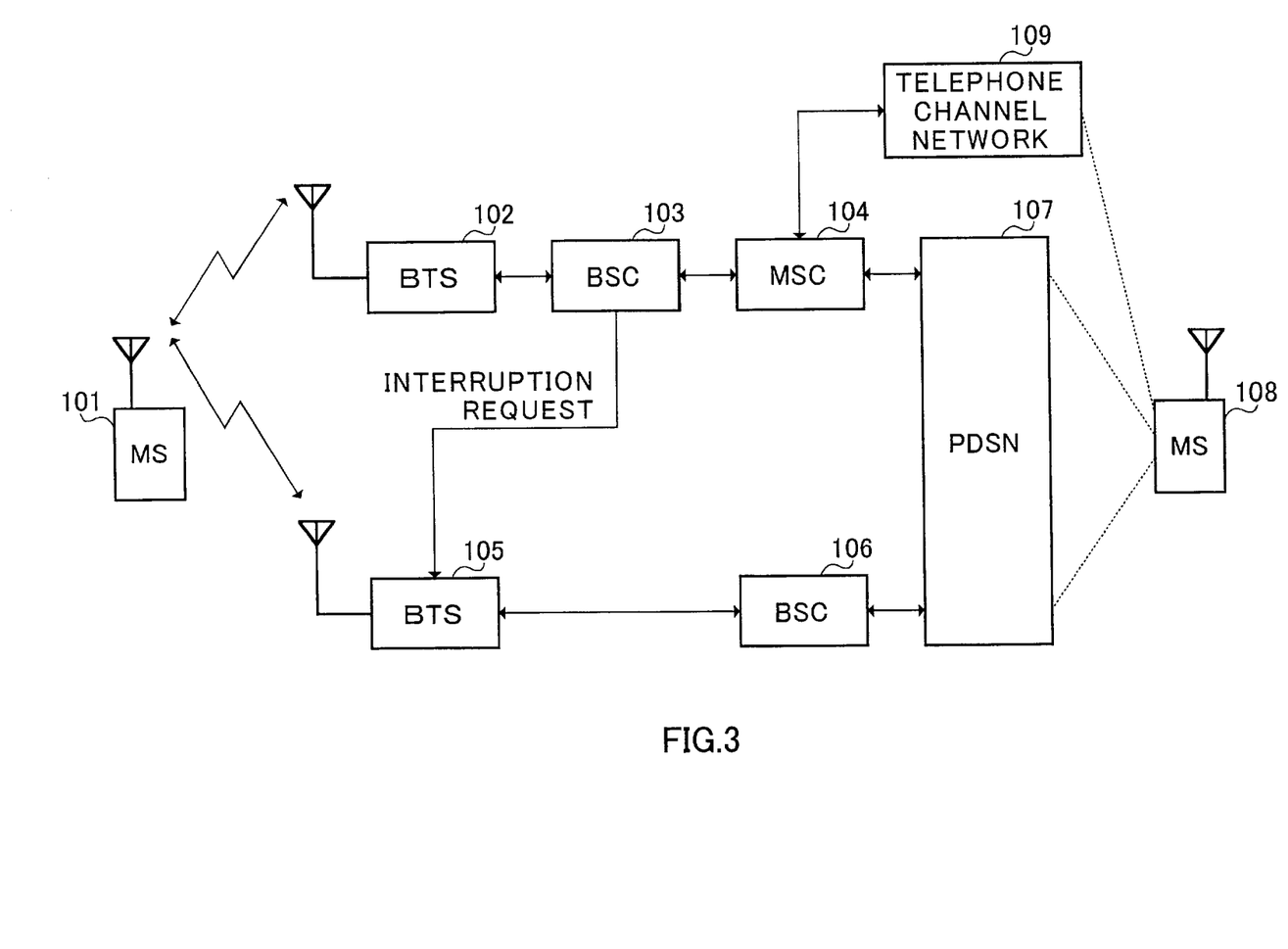
FIG. 3 shows a diagram showing a sample configuration of a communication system that combines HDR system and IS-2000 system.

FIG. 3 is a diagram showing a sample configuration of a wireless communication system according to the present embodiment that combines HDR system and IS-2000 system. In this diagram, the communication apparatus comprising base station (BTS) 102, wireless network control station (BSC) 103, and mobile switching center (MSC) 104 offers the services of IS-2000 system. IS-2000 system offers speech communication services and low-speed packet communication services that lay emphasis on the real-time aspect. The low-speed packet communication services include speech communication services by VoIP (Voice over IP).

A speech signal transmitted from mobile station (MS) 101 which is also a communication terminal is received at BTS 102, and the data obtained after a predetermined set of processing is sent to MSC 104 via BSC 103. At MSC 104, data from several base stations are linked and sent to telephone channel network 109. The speech signal is transmitted to a remote end in communication (MS 108, for example) via telephone channel network 109. A low-speed packet transmitted from MS 101 is transmitted to MS 104 after the same processing as those executed on a speech signal, and transmitted from MSC 104 to a remote end in communication (MS 108) via PDSN 107. On the other hand, a speech signal transmitted from another mobile station (MS) 108 is sent to MSC 104 via telephone channel network 109, and sent from MSC 104 to BTS 102 via BSC 103, and transmitted from BTS 102 to each MS accommodated under the base station. Furthermore, a low-speed packet transmitted from MS 108 is sent to BTS 102 via PDSN 107, MSC 104, and BSC 103, and then transmitted from BTS 102 to each MS accommodated under the base station. Incidentally, MS 101 and MS 108 each have the function for performing both speech communication and packet communication.

A communication apparatus comprising base station (BTS) 105 and BSC 106 offers the services of HDR system in which high-speed packet communication services are mainly offered. A high-speed packet here means "a packet transmitting at a high-speed" or "a packet with a high transmission rate."

A high-speed packet transmitted from MS 101 is received at base station (BTS 105), and the received data obtained after a predetermined set of processing is sent to PDSN 107 via BSC 106. A high-speed packet transmitted from MS 108 is sent to BSC 106 via PDSN 107, and then sent to BTS 105 where communication resources are assigned to each MS and the transmit packets generated in accordance with the assignment are transmitted.

It is currently under consideration to make the covered areas of BTS 105 and BTS 102 the same. Accordingly, in FIG. 3, the covered area of BTS 102 and the covered area of BTS 105 are the same, and MS 101 is accommodated under both BTS 102 and BTS 105.

In order to operate HDR system in combination with IS-2000 system, HDR system is assigned frequencies that differ from those of IS-2000 system (or IS-95 system). By this means, it is possible to make the two systems coexist and to build a wireless communication system that combines both systems. A wireless communication system constructed by thus combining IS-2000 system and HDR system can offer comprehensive services (1xHDR/IS-2000) that include the services of IS-2000 system and the services of HDR system.

As described above, the wireless communication system shown in FIG. 3 is a system that combines HDR system and IS-2000 system. In this system, a communication terminal performing communication under one of the systems might receive an interruption request from the other system. That is, a mobile station performing communication in one system may be requested to start communication in the other system. For instance, a mobile station performing high-speed packet communication in HDR system may receive a call from IS-2000 system.

Process of such interruption request will be described next. In the wireless communication system shown in FIG. 3 where MS 101 performs high-speed packet communication in HDR system, another mobile station (MS 108, in this context) makes a request for communication with MS 101 to telephone channel network 109. Telephone channel network 109 sends an interruption request signal to BS 105 via MSC 104 and BSC 103. Furthermore, a request for packet communication with MS 101 is made by MS 108 to PDSN 107, and PDSN 107 sends an interruption request signal to BTS 105 via BSC 106. Upon receiving an interruption request signal, BTS 105 assigns communication resources taking into consideration that MS 101 received an interruption request from IS-2000 system.

Now, the assignment of communication resources by BTS 105 will be described. BTS 105 first sends a packet configured as shown in FIG. 2 to each mobile station (including MS 101) accommodated under the base station. MS 101 measures the forward link channel quality (CIR :Carrier to Interference Ratio, for instance) based on the pilot signal included in a packet transmitted from BTS 105.

Each mobile station stores a table that denotes correspondence between forward link channel qualities and the best communication mode for packet transmission with these channel qualities. Each mobile station refers to this table and selects a communication scheme that enables the most efficient high-speed packet communication with the measured channel quality. A communication scheme refers to a combination of the slot length assigned to transmit data, coding rate, modulation scheme, and spreading factor for transmit data. Each mobile station transmits signals (Data Rate Control Signals: DRC signal) that denote a selected communication mode to BTS 105 that then assigns communication resources to each mobile station based on the DRC signals transmitted from each mobile station.

Figure 4:
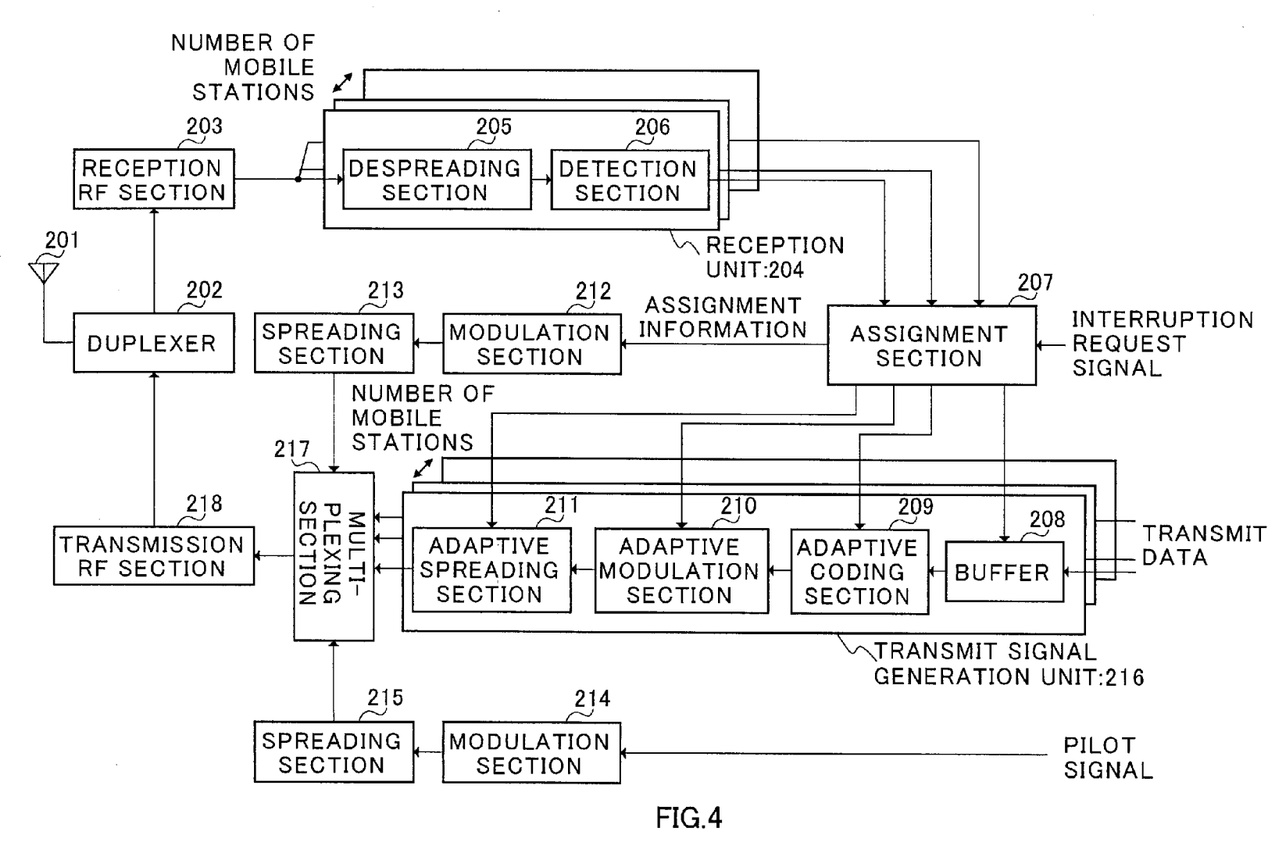
FIG. 4 shows a functional block diagram showing the configuration of a base station accommodated in HDR system according to Embodiment 1.

FIG. 4 is a functional block diagram showing the configuration of BTS 105 which is a base station accommodated in HDR system. As shown in the figure, BTS 105 receives a DRC signal transmitted from MS 101 by way of antenna 201 and outputs the signal to a reception line via duplexer 202. The reception line executes wireless reception processing on the received signal (DRC signal) by means of reception RF section 203, and, after decoding the signal in reception unit 204, obtains the DRC signal. Reception unit 204 comprises despreading section 205 that executes despreading processing on a received signal and detection section 206 that demodulates the despreading results. To demodulate the DRC signals transmitted from each MS, reception unit 204 is disposed in the number of the mobile stations accommodated in the covered area of BTS 105. The DRC signal is then output to assignment section 207.

Assignment section 207 recognizes channel quality with each communication terminal by referring to the DRC signal demodulated in detection section 206 and assigns communication resources, whereupon priority is given to communication terminals with good channel quality. That is, assignment section 207 assigns a large number of transmit slots to mobile stations with good channel quality and controls the coding rate, modulation scheme, and spreading factor, to increase the transmission rate for the data for mobile stations with good channel quality. When an interruption request signal is input from telephone channel network 109 (shown in FIG. 3) via MSC 104 and BSC 103, assignment section 207 modifies priority of MS (MS 101, in this context) in respect to which an interruption request is made higher than when there is no interruption request and performs the assignment of communication resources accordingly. Assignment section 207 then generates control information (assignment information) that denotes the assignment of communication resources with each MS. Assignment information is modulated in modulation section 212 and, after spreading processing using a unique spreading code is executed thereupon in spreading section 213, output to multiplexing section 217.

Assignment section 207 controls buffer 208, adaptive coding section 209, adaptive modulation section 210, and adaptive spreading section 211 in accordance with the assignment of communication resources. In other words, upon determining an assignment of communication resources, assignment section 207 controls buffer 208 such that an amount of data that can be accommodated in a transmit slot each MS is assigned is output from buffer 208 to adaptive coding section 209. Also, to increase the transmission rate for the data for mobile stations with good channel quality, assignment section 207 instructs adaptive coding section 209 as to the coding rate for the transmit data, instructs adaptive modulation section 210 as to the modulation scheme for the transmit data, and instructs adaptive spreading section 211 as to the spreading factor for the transmit data, in accordance with the content denoted with the DRC signal.

Transmit data held by buffer 208 is output to adaptive coding section 209 in accordance with the control by assignment section 207, and then coded in adaptive coding section 209 at a decoding rate in accordance with the control by assignment section 207. In adaptive modulation section 210, then, the coded transmit data is modulated in a modulation scheme in accordance with the control by assignment section 207. In adaptive spreading section 211, furthermore, the modulated transmit data is spread at a spreading factor in accordance with the control by assignment section 207 and then output to multiplexing section 217.

The pilot signal, already known to both BTS 105 and each MS, is modulated in a predetermined modulation scheme in modulation section 214, subjected to spreading processing with a predetermined spreading factor in spreading section 215, and then output to multiplexing section 217.

Incidentally, transmit signal generation unit 216 that comprises buffer 208, adaptive coding section 209, adaptive modulation section 210, and adaptive spreading section 211 is disposed in the number of mobile stations accommodated in BTS 105.

Multiplexing section 217 time-division-multiplexes the control information (assignment information) that is output from spreading section 213, transmit data that is for each MS and that is output from adaptive spreading section 211 disposed in transmit signal generation unit 216, and pilot signals output from spreading section 215, and outputs the time-division-multiplexed signal to transmission RF section 218. Transmission RF section 218 executes wireless transmission processing including up-conversion on a transmit signal output from multiplexing section 217, and transmit the signal from antenna 201 to each MS via duplexer 202.

Next, the operation of a wireless communication system of the above configuration will be described. In particular, the operation of a wireless communication system in a case where MS 101 receives an interruption request from IS-2000 system while performing high-speed packet communication in HDR system will be described in detail.

When MS 101 performs high-speed packet communication, BTS 105 transmits packets configured as shown in FIG. 2 to each MS (including MS 101) accommodated under BTS 105 at a constant power at all times. MS 101 measures the forward link channel quality (e.g., CIR) based on the pilot signal included in a signal transmitted from BTS 105 and selects a communication mode that enables the most efficient high-speed packet communication with the measured channel quality. MS 101 then sends a DRC signal that denotes the selected communication mode to BTS 105. Other mobile stations (not shown in the figures) accommodated under BTS 105 similarly transmit DRC signals to BTS 105. BTS 105 assigns communication resources by referring to the DRC signals sent from each MS, generates transmit packets shown in FIG. 2 in accordance with this assignment of communication resources, and sends packets to each MS. MS 101 thus performs high-speed packet communication in HDR system.

In contrast, in order to perform communication (e.g., speech communication) with MS 101 in IS-2000 system, MS 108 requests MS 101 for an interruption. To be more specific, MS 108 makes a request for communication (communication request) with MS 101 under IS-2000 system to telephone channel network 109. Telephone channel network 109 sends an interruption request signal to BS 105 via MSC 104 and BSC 103.

At BTS 105, in assignment section 207, communication resources are assigned to each MS based on the DRC signals sent from each MS in the covered area and the interruption request signals input from BSC 103. That is, in assignment section 207, priority of the mobile station (MS 101, in this context) in respect to which an interruption request is made is modified higher than when there is no interruption request, and communication resources are assigned accordingly. The data for a mobile station with high priority in the assignment of communication resources is sent at a high transmission rate, so that a mobile station with high priority completes high-speed packet communication in short time.

Transmit data for each MS accommodated under BTS 105 is output from buffer 208 to adaptive coding section 209 in an amount that can be stored in the transmit slot assigned by assignment section 207. The transmit data output from buffer 208 undergoes coding processing in adaptive coding section 209 in accordance with a coding scheme controlled by assignment section 207, undergoes modulation processing in modulation section 210 in accordance with a modulation scheme controlled by assignment section 207, and undergoes spreading processing in adaptive spreading section 211 in accordance with a spreading factor controlled by assignment section 207. Thereafter in multiplexing section 217, transmit data for each MS, pilot signals, and the assignment information that denotes the assignment of communication resources with each communication terminal are multiplexed and then sent from antenna 201 via duplexer 202 in wireless transmission, after wireless transmission processing such as up-conversion in transmission RF section 218. By this means, when there is an interruption request from IS-2000 system to MS 101 that is performing high-speed packet communication, it is possible to finish high-speed packet communication in less time than when there is no interruption request by modifying priority of MS 101 higher than when there is no interruption request and by then assigning communication resources accordingly.

When high-speed packet communication is finished, PDSN 107 starts communication in IS-2000 system. By this means, even when there is an interruption request from IS-2000 system during high-speed packet communication, it is possible to reduce the time that MS 101, which is in respect to which an interruption request is made, requires for high-speed packet communication and to reduce the time before communication starts under IS-2000 system. Consequently, it is possible to reduce the waiting time on the part of the calling party in IS-2000 system and enhance the user's convenience. Also, this reduction in the waiting time leads to power saving.

The assignment of communication resources where MS 101 receives an interruption request from IS-2000 system (a case where an interruption request is input into assignment section 207) will be further described. Generally, the assignment of communication resources in HDR system is performed such that mobile stations with good channel quality are given many transmit slots, and the coding rate, modulation scheme, and spreading factor are controlled so as to improve the transmission rate for the data for communication terminals with good channel quality. For the methods for modifying priority of MS 101 in the assignment of communication resources higher than when there is no interruption request by controlling these parameters, the following might be thought of:

(1) Modifying the number of transmit slots assigned to data for MS 101 larger than the number of transmit slots assigned when there is no interruption request.
(2) Coding the transmit data for MS 101 at a lower coding rate than a coding rate used when there is no interruption request.
(3) Modulating the transmit data for MS 101 by using a modulation scheme of a modulation level higher than that of a modulation scheme used when there is no interruption request.
(4) Spreading the transmit data for MS 101 at a lower spreading factor than a spreading factor used when there is no interruption request.

Assignment section 207 gives a higher priority to MS 101 in the assignment of communication resources by using at least one method from the above (1) through (4). Means for prioritizing MS 101 is not limited to the above (1) through (4), and any means that enables to finish high-speed packet communication that MS 101 performs in less time than when there is no interruption request suffices.

Incidentally, in case of the above (1) means, assignment section 207 controls buffer 208 such that an amount of data that can be accommodated in the transmit slot assigned to each MS by the modified assignment scheme is output from buffer 208 to adaptive coding section 209. In case of the above (2) means, assignment section 207 controls adaptive coding section 209 so as to code transmit data at a modified coding rate. In case of the above (3) means, assignment section 207 controls adaptive modulation section 210 so as to modulate transmit data by a modified modulation scheme.

In case of the above (4) means, assignment section 207 controls adaptive spreading section 211 so as to spread transmit data at a modified spreading factor. Incidentally, examples of modulation schemes include BPSK, QPSK, 16QAM, and examples of coding schemes include ½ turbo coding, ⅓ turbo coding, and ¾ turbo coding.

Figure 5A:
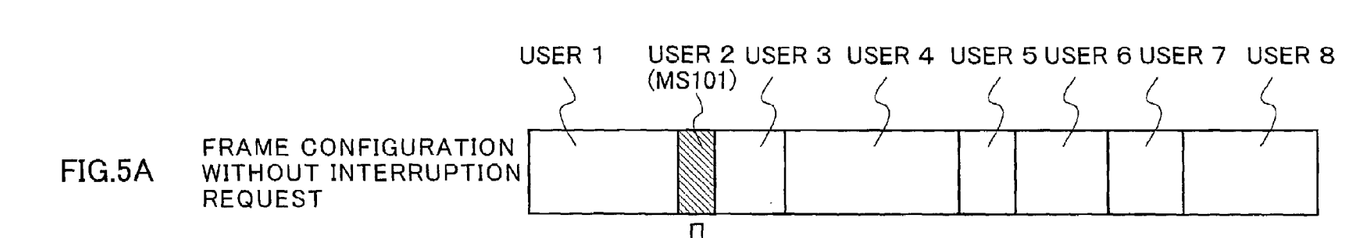
FIG. 5A shows a diagram showing a frame configuration without an interruption request.
Figure 5B:
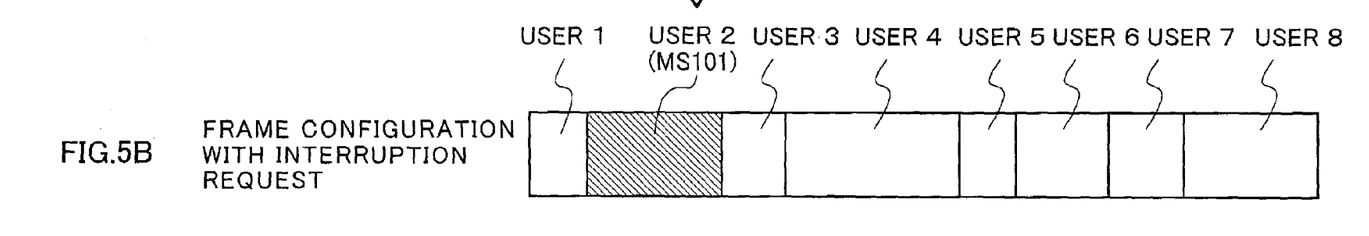
FIG. 5B shows a diagram showing a frame configuration a frame configuration with an interruption request.

Now, the control for modifying the number of transmit slots assigned to transmit data for MS 101 larger than the number of transmit slots assigned when there is no interruption request will be described further in detail with FIG. 5A and FIG. 5B. FIG. 5A and FIG. 5B show in comparison a frame configuration without an interruption request, and a frame configuration with an interruption request, in which transmit slots are assigned using the above (1) means. FIG. 5A is a sample frame configuration with respect to a case without an interruption request, and FIG. 5B is a sample frame configuration with respect to a case with an interruption request. FIG. 5A and FIG. 5B illustrates a case where users 1 through 8 are each accommodated under BTS 105.

In FIG. 5A, channel quality is poor with respect to user 2 (MS 101, in this context), and relatively few transmit slots are assigned to the data for MS 101. Where transmit slots are assigned to each user as shown in FIG. 5A and when there is an interruption request to MS 101 (user 2), as shown in FIG. 5B, the transmit data for MS 101 is assigned a larger number of transmit slots than the transmit slots assigned when there is no interruption request (case shown as FIG. 5A). Thus by assigning MS 101 a larger number of transmit slots than when there is no interruption request, the transmission rate of the data for MS 101 increases, so that MS 101 can finish high-speed packet transmission in short time.

As a means for modifying priority of MS 101 in the assignment of communication resources when MS 101 receives speech communication higher than when there is no speech communication received, the (1) means for modifying the assignment of transmit slots is the most desirable one of the above (1) through (4). This is because the means (2) through (4) have a possibility of resulting in an overload on the overall system, since an increase in the transmission rate of MS 101 may result in an increase in the transmission rate of the overall system. With the (1) means, when the transmission rate with MS 101 increases, the transmission rates for other mobile stations drop by the increase, so that the transmission rate of the overall system does not increase, and the system suffers no overload. This difference between the (1) means and the means (2) through (4) is particularly obvious in terms of error resistance. That is, with respect to each of the means (2) through (4), transmission rate is made higher without modifying the slot length assigned to MS 101, which deteriorates error resistance. On the other hand, with the (1) means, the transmission rate is modified higher by the assignment of a large number of slots to MS 101 (by extending the slot length assigned to MS 101), and so that error resistance does not deteriorate.

Thus, with the present embodiment, priority of a mobile station in respect to which an interruption request is made from IS-2000 system is modified higher than when there is no interruption request and communication resources are assigned accordingly. By this means, the high-speed packet communication that a mobile station in respect to which an interruption request is made performs in HDR system can be finished in short time, while communication starts under IS-2000 system, so that it is possible to reduce the waiting time before communication starts in IS-2000 system and to enhance the transmission rate in the overall system. Also, by reducing the waiting time after a call until communication starts under IS-2000 system, it is possible to reduce the time that a communication terminal on the calling side takes to actually perform calling, and to generate an advantageous effect of reducing the power consumption of a mobile station.

With respect to the present embodiment, assignment section 207 disposed in BTS 105 assigns communication resources to each mobile station based on DRC signals and interruption request signals. However, it is good as well to dispose this assignment section 207 in PDSN 107 and input an interruption request signal into assignment section 207 disposed in PDSN 107, and have PDSN 107 perform the assignment of communication resources. In this case, BTS 105 is informed of the result of communication resource assignment, and BTS 105 generates transmit signals in accordance with the informed communication resource assignment result. Furthermore, assignment section 207 may well be disposed in any device in the communication system shown in FIG. 3.

IS-2000 is a system developed as a successor for IS-95 which is already in commercial services. IS-2000 system uses the same bandwidths as those of IS-95 system (1.25 MHz), which enables to implement a base station for IS-2000 by slightly modifying an IS-95 base station. Also, operating HDR system in combination with IS-2000 system is under consideration, and a base station for HDR can be implemented by developing an IS-2000 base station (or IS-95 base station). The HDR base station (BTS 105) in the present embodiment is described to be disposed separately from the IS-2000 base station (BTS 102). However, considering the above facts, it may be good as well that BTS 102 that has been actually set up and started commercial services (IS-95 services) has the functions of BTS 105.

Embodiment 2

This embodiment illustrates a case of increasing the transmission rate of the data for MS 101 in a high-speed packet communication context by modifying the communication mode selected by the mobile station (MS 101) side. Since the wireless communication system according to the present embodiment has a configuration nearly identical with that of the wireless communication system according to Embodiment 1, the present embodiment will be described with reference to FIG. 3.

When there is an interruption request (communication request) from BTS 102, mobile station (MS) 101 takes into consideration the impact the slot length, coding rate, modulation scheme, and spreading factor have on the transmission rate of the high-packet communication, and selects a communication mode whereby the transmission rate for the data sent to the mobile station becomes higher than when there is no interruption request. The mobile station then sends a DRC signal denoting the selected communication mode to BTS 105. Since BTS 105 assigns communication resources making reference to the transmitted DRC signals, it is possible to transmit data at a higher transmission rate than when there is no interruption request.

Embodiment 3

The communication system according to this embodiment is characterized in that, when there is a call from IS-2000 system for a mobile station performing high-speed packet communication, a network calculates a finishing time of the high-speed packet communication, and the calling party under IS-2000 system is informed of the calculated finishing time. Since the wireless communication system according to this embodiment has a configuration nearly identical with that of the wireless communication system in FIG. 3, this embodiment will be described with FIG. 3 and only in points that differ from Embodiment 1.

When a communication request with MS 101 is made to telephone channel network 109 by MS 108 while MS 101 is performing high-speed packet communication in HDR system, telephone channel network 109 sends an interruption request signal to BTS 105 via MSC 104 and BSC 103. BTS 105 sends the interruption request signal to PDSN 107 via BSC 106. Upon receiving the interruption request signal from BSC 106, PDSN 107 calculates a finishing time for the high-speed packet communication that MS 101 is performing. The high-speed packet communication finishing time can be calculated, for instance, by dividing the remaining transmit data by the transmission rate. PDSN 107 generates a finishing time signal that denotes the calculated finishing time and transmits the generated finishing time signal to MS 108 using either IS-2000 system or HDR system.

By receiving a finishing time signal and showing the finishing time on a display, or by outputting the finishing time from a speaker using speech, MS 108 informs the user (speech communication calling party) of the finishing time of high-speed packet communication. By this means, the user learns the time left until high-speed packet communication is finished. The method whereby MS 108 informs the user of a finishing time is not limited to the above-described methods.

Thus with the present embodiment, when a mobile station receives from another mobile station a request for communication under IS-2000 system while the mobile station is performing high-speed packet communication in HDR system, PDSN 107 calculates a finishing time for the high-speed packet communication and informs the calling party of the calculated finishing time. By thus learning the finishing time for high-speed packet communication, the calling party is able to stop calling temporarily until the finishing time and start calling again around the time the high-speed packet communication is finished, and it is thus possible to use time efficiently without making unnecessary calls.

The present embodiment illustrates a case where an interruption request signal is transmitted from telephone channel network 109 to PDSN 107 via BTS 105. However, the present invention is not limited to such case, and it is good as well to arrange such that an interruption signal is sent from telephone channel network 109 straight to PDSN 107.

Furthermore, when a request for packet communication with MS 101 is made to PDSN 107 from MS 108 while MS 101 is performing high-speed packet communication in HDR system, PDSN 107 calculates a finishing time for the high-speed packet communication that MS 101 is performing.

Embodiment 4

Embodiment 4 is a modification of Embodiment 3 and differs from Embodiment 2 in that a mobile station that receives a finishing time signal suspends calling until the finishing time of high-speed packet communication, without any particular operation from the user.

By referring to a finishing time signal sent from PDSN 107, MS 108 learns the time left until the finishing time of the high-speed packet communication that MS 101 is performing. MS 108 then temporarily suspends calling until the finishing time and resumes calling under IS-2000 system after high-speed packet communication is finished. With this embodiment, it is possible to reduce the power consumption on the part of the calling party by making no call during high-speed packet communication and during the period communication cannot be performed under IS-2000 system. Also, it is possible to enhance use efficiency of wireless channels.

A case where MS 101 performing high-speed packet communication in HDR system receives an interruption request from another mobile station will be described with respect to the above configuration. When MS 108 makes a request for communication with MS 101 to telephone channel network 109, telephone channel network 109 sends an interruption request signal to BTS 105 via MSC 104 and BSC 103. BTS 105 sends the interruption request signal to PDSN 107 via BSC 106. PDSN 107 calculates a finishing time for the high-speed packet communication MS 101 is performing. In this case, an interruption request signal is sent (that is, an interruption is requested), and so the assignment of communication resources in HDR system is performed such that priority of MS 101 becomes higher than when there is no communication request signal is sent (or when no interruption is requested), whereby MS 101 is able to finish high-speed packet communication in less time than when no interruption request signal is transmitted. So PDSN 107 takes into consideration that high-speed packet communication may finish in short time and calculates a finishing time. PDSN 107 generates a finishing time signal that denotes the calculated finishing time and transmits the generated finishing time signal to MS 108. By this means, it is possible to reduce the power consumption on the part of the calling party by making no call while communication cannot be performed under IS-2000.

Embodiment 5

With respect to above Embodiment 1 through Embodiment 4, when a mobile station performing high-packet communication in HDR system receives an interruption request from IS-2000 system, communication under IS-2000 system starts after the high-speed packet communication is finished. However, there are cases where it is desirable to prioritize speech communication, such as when the time required for high-speed packet communication is foreseen to be exceptionally long or when communication under IS-2000 system is urgently needed. With respect to the wireless communication system according to the present embodiment, when a mobile station performing high-speed packet communication in HDR system receives an interruption request from IS-2000 system, high-speed packet communication with the mobile station in respect to which an interruption request is made is temporarily suspended and communication under IS-2000 system is performed with priority.

The communication system according to the present embodiment will be described. Since the communication system according to the present embodiment has a configuration nearly identical with that of the communication system in FIG. 3, only those points that differ from Embodiment 1 will be described with reference to FIG. 3.

When MS 101 receives an interruption request from MS 108 while performing high-speed packet communication under HDR system, PDSN 107 accepts the interruption request and suspends high-speed packet communication with the mobile station (MS 101) in respect to which an interruption request was made. Upon thus suspending high-speed packet communication, PDSN 107 informs telephone channel network 109 to the effect of the suspension and starts communication under IS-2000 system between MS 101 and MS 108. Also, PDSN 107 monitors BTS 105 and recognizes the data that was unsent at the time high-speed packet communication was suspended from among the transmit data that is for MS 101 and that buffer 208 holds. When communication under IS-2000 system is finished, PDSN 107 resumes high-speed packet communication with MS 101, whereupon PDSN 107 informs BTS 105 of the address of unsent data in buffer 208. Of the transmit data forMS 101, BTS 105 specifies the unsent data by referring to the address informed by PDSN 107 and reads out from buffer 208 and transmits this unsent data. With PDSN 107 thus learning the address of unsent data in buffer 208, it is possible to transmit the unsent data alone without transmitting the already-sent packets even when high-speed packet communication is suspended before completion. By this means, an advantageous effect of reducing communication time after high-speed packet communication is resumed can be achieved.

Next, the communication system according to the present embodiment will be described further in detail with reference to FIG. 4. When MS 101 performs high-speed packet communication, assignment section 207 assigns communication resources to the mobile stations (including MS 101) included in the area BTS 105 covers. When high-speed packet communication is suspended by an interruption request from IS-2000 system, assignment section 207 assigns communication resources to the mobile stations included in the covered area except for MS 101.

When high-speed packet communication resumes after communication under IS-2000 system is finished, an address signal that denotes the address of unsent data is input from PDSN 107 into assignment section 207. Assignment section 207, upon receiving an address signal, starts assigning communication resources again to mobile stations including MS 101. Furthermore, assignment section 207 learns the address of unsent data in buffer 208 by referring to the address signal and controls buffer 208 so as to read out data from the address. By this means, after an address signal is input into buffer 208, the unsent data alone is read out from buffer 208. The unsent data read out from buffer 208 is coded in adaptive coding section 209 and modulated in adaptive modulation section 210. Then after spreading processing in adaptive spreading section 211 and time-division multiplexing with a pilot signal and the assignment information in multiplexing section 217, a transmit signal is formed. A transmit signal is then subjected to predetermined wireless transmission processing in transmission RF section 218 and then transmitted from antenna 201 via duplexer 202.

With this embodiment, PDSN 107 learns the address of unsent data in buffer 208. By this means, even when high-speed packet communication is suspended before completion, BTS 105 is able to read out the unsent data alone from buffer 208 and transmit the read-out unsent data when high-speed packet communication resumes. In other words, of all the data transmitted in high-speed packet communication, the already-sent data is not transmitted in repetition, but the unsent data alone is transmitted, which makes it possible to reduce the communication time after high-speed packet communication resumes.

With the present embodiment, PDSN 107 determines the suspension/resumption of high-speed packet communication. However, any of MS 101, BTS 102, BTS 105, BSC 103, and MSC 104 may perform the determining.

Embodiment 6

Services IS-2000 system mainly offers using the channels of relatively low transmission rates (8 kbps) are those of speech communication that lays emphasis on the real-time aspect. By using these same channels, IS-2000 system is able to offer highly burst data communication services as well (low-speed packet communication services). ). With the above taken into consideration, a case will be described here where, In view of the foregoing, this embodiment explains a case where when a mobile station performing a high-speed packet communication in HDR system receives an interruption request from IS-2000 system, the high-speed packet communication in the mobile station given interruption request is suspended to start a communication under IS-2000 system, and the data that is to be transmitted in high-speed packet communication is inserted into an empty slot on a wireless channel which is assigned to IS-2000 system and transmitted.

With above Embodiment 1 through Embodiment 5, when a mobile station performing high-speed packet communication in HDR system receives an interruption request from IS-2000 system, data for high-speed packet communication is still transmitted by HDR system. The present embodiment differs from the above embodiments significantly in that data for high-speed packet communication is transmitted by IS-2000 system.

The wireless communication system according to the present embodiment will be described next. The communication system according to the present embodiment has a configuration nearly identical with that of the wireless communication system in FIG. 3 and only those points that differ from Embodiment 1 will be described with reference to FIG. 3.

When a request for communication with MS 101 is made to telephone channel network 109 from MS 108 while MS 101 is performing high-speed packet communication under HDR system, telephone channel network 109 sends an interruption request signal to BTS 105 via MSC 104 and BSC 103. BTS 105 sends the interruption request signal to PDSN 107 via BSC 106. Upon receiving the interruption request signal from BSC 106, PDSN 107 suspends high-speed packet communication and starts communication under IS-2000 system. When the high-speed packet communication is suspended, BTS 105 sends transmit data for MS 101 (data for high-speed packet communication) to BTS 102 via BSC 106, PDSN 107, MSC 104, and BSC 103. BTS 102 converts the data for high-speed packet communication sent from BTS 105 into a data form for low-speed data communication and transmits the data to MS 101 by inserting the data into an empty slot on a wireless channel assigned to IS-2000 system.

Figure 6:
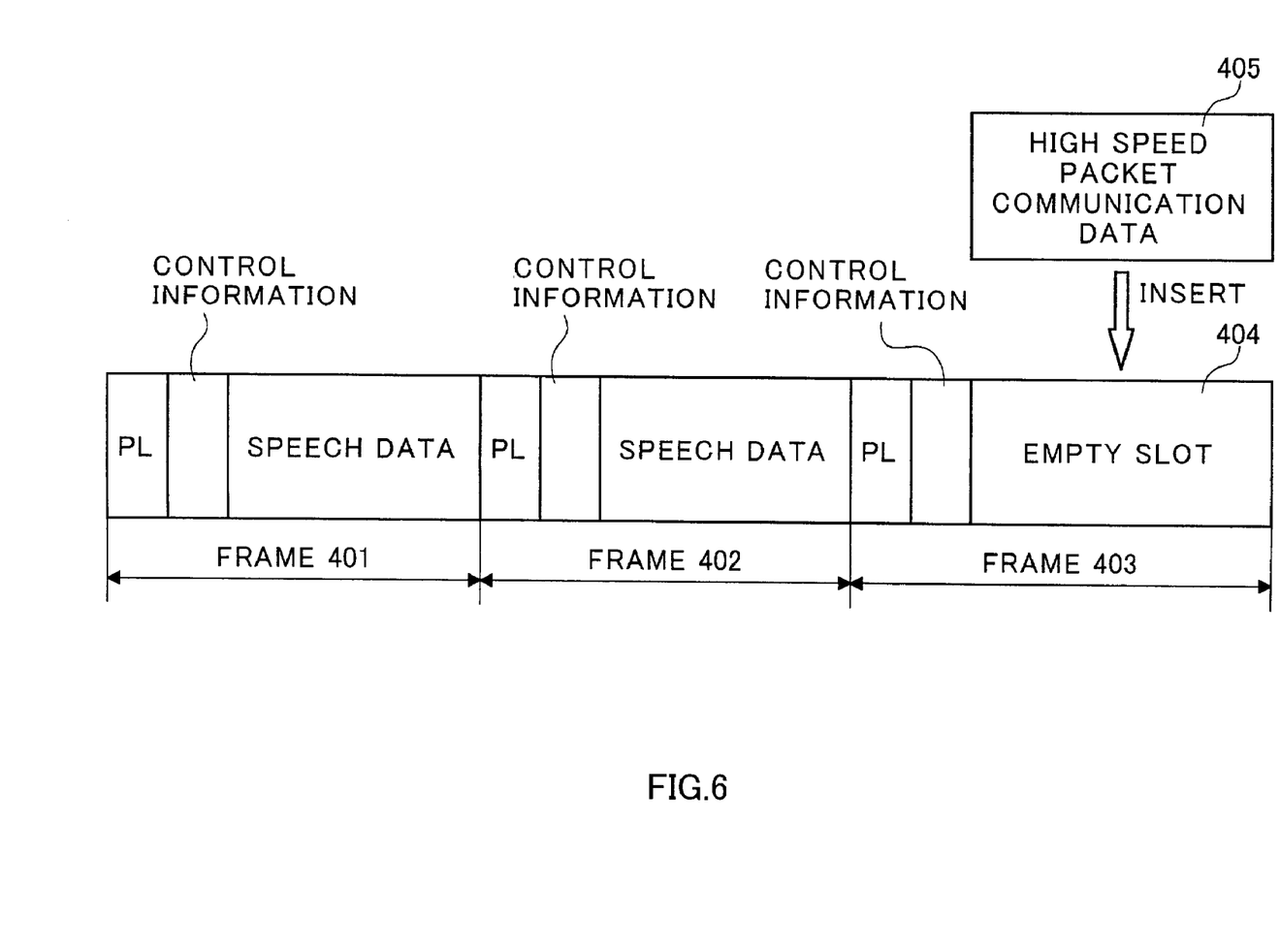
FIG. 6 shows a sample configuration of a transmit slot transmitted using a wireless channel assigned to IS-2000 system.

FIG. 6 shows a sample configuration of a transmit slot that transmits using a wireless channel assigned to IS-2000 system. As shown in this figure, frame 401 and frame 402 are each formed when a pilot signal and the control information that includes TPC are added to speech data (or data for low-speed packet communication). In contrast, frame 403 is a slot that corresponds to the silent section in speech communication. So, no speech data exists in the data portion in frame 403, and the data portion becomes empty slot 404. When high-speed packet communication with MS 101 is suspended, data for high-speed packet communication is sent from BTS 105 to BTS 102. BTS 102 converts this high-speed packet communication data into a data form for low-speed packet communication and inserts the converted high-speed packet communication data 405 into empty slot 404 and transmits the slot to MS 101.

With the present embodiment, as described above, when a mobile station performing a high-speed packet communication in HDR system receives an interruption request from IS-2000 system, high-speed packet communication with the mobile station having received the interruption request is suspended, and low-speed packet communication under IS-2000 system is performed by inserting high-speed packet communication data 405 into empty slot 404. By this means, it is possible to transmit high-speed packet communication data using an empty slot that is wasted under IS-2000 system, and to enhance the transmission efficiency of the overall system. It is also possible to finish high-speed packet communication while conversation is in progress, which is very useful for the user.

With the present embodiment, high-speed packet communication data is converted into a data format for low-speed data communication at BTS 102. However, any of BSC 103, MSC 104, PDSN 107, and BTS 105 can perform the conversion.

Embodiment 7

The present embodiment is a modification of Embodiment 1 and differs therefrom in that the present embodiment assigns provisional communication resources according to the channel quality of mobile stations.

Figure 7:
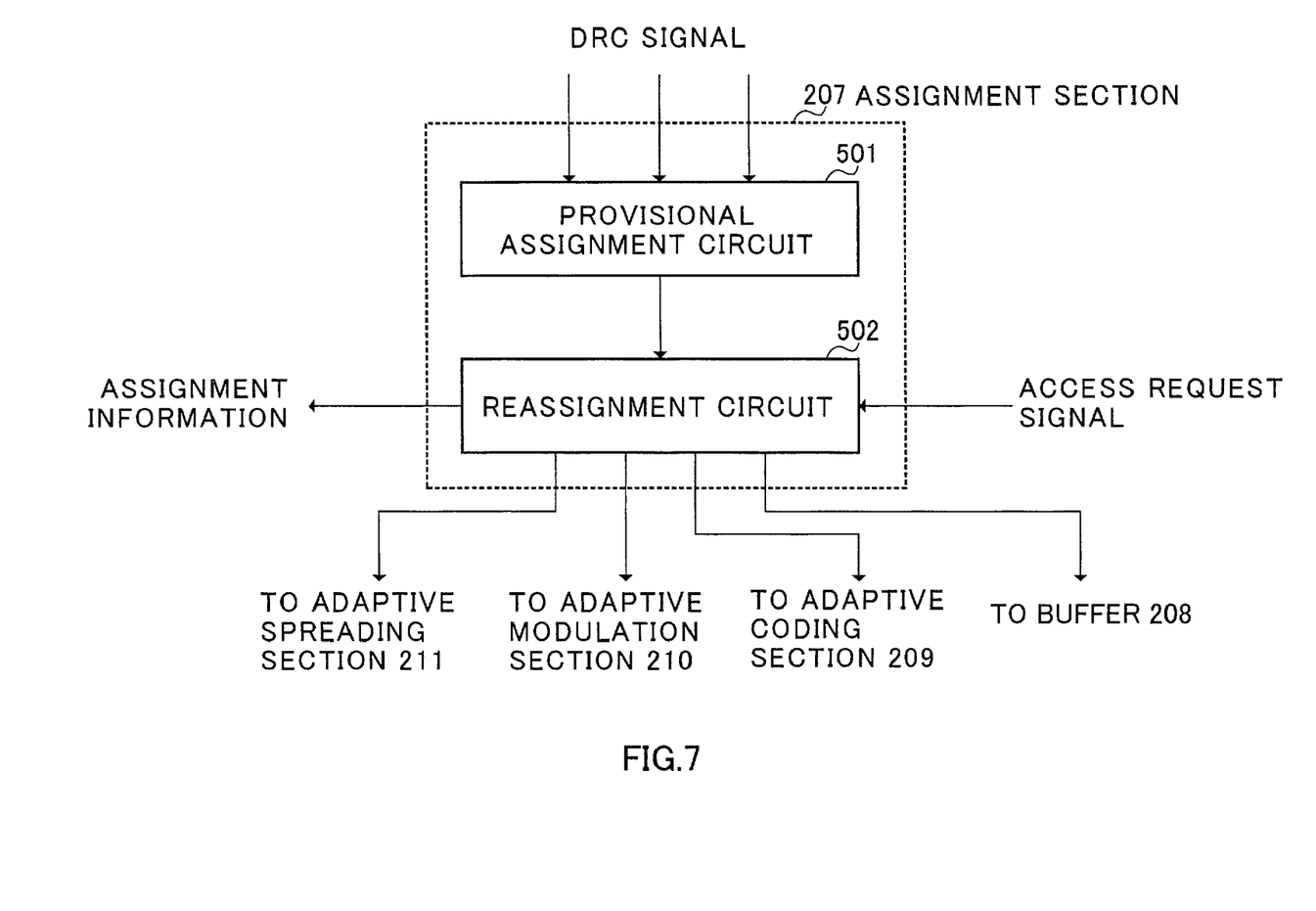
FIG. 7 shows a functional block diagram showing the configuration of an assignment section according to Embodiment 7.

FIG. 7 is a functional block diagram showing the configuration of assignment section 207. The sections other than assignment section 207 are identical with the configuration shown in FIG. 4, and detailed description of these identical sections will be omitted. Assignment section 207 according to the present embodiment comprises provisional assignment circuit 501 that assigns provisional communication resources based on the DRC signals output from detection section 206, and reassignment circuit 502 that reassigns communication resources when an interruption request signal is input.

By making reference to the DRC signals input from detection section 206, provisional assignment circuit 501 leans the channel quality for each mobile station accommodated under BTS 105 and assigns provisional communication resources to the mobile stations in the order of the learned channel quality, whereupon mobile stations with good channel quality are given higher priority.

When an interruption request signal is output from BSC 106, reassignment circuit 502 modifies priority of the mobile station (in this context MS 101) in respect to which an interruption request is made higher than it was set in provisional assignment circuit 501. Reassignment circuit 502 assigns communication resources again in accordance with the modified priority and controls buffer 208, adaptive coding section 209, adaptive modulation 210, and adaptive spreading section 211 in a way that these sections comply with the communication resource assignment.

As described above, with the present embodiment, provisional communication resources are assigned in a way to make the priority of communication terminals with good channel quality high. When there is an interruption request, priority of the communication in respect to which an interruption request is made is made higher than it was set when provisional communication resources were assigned, and communication resources are assigned again. By this means, when there is an interruption request to MS 101, it is possible to finish high-speed packet communication with MS 101 in short time and to reduce the waiting time before communication starts under IS-2000 system.

Incidentally, the above embodiments can be implemented in combination. For instance, it is possible to combine Embodiment 4 and Embodiment 5, and to transmit the data that is unsent when the high-packet communication with the mobile station in respect to which an interruption request is made is suspended, by inserting the data into an empty slot on a wireless channel assigned to IS-2000 system.

Thus with the present invention, as described above, by adequately operating HDR system and IS-2000 system, it is possible efficiently combine the services in both systems to provide.

This application is based on the Japanese Patent Application No.2000-363649 filed on Nov. 29, 2000, entire content of which is expressly incorporated by reference herein.

INDUSTRIAL APPLICABILITY

The present invention is suitable for use in a wireless communication system that combines HDR system and IS-2000 system, and for use in a base station apparatus and a communication terminal accommodated in the system.

The invention claimed is:

1. A base station apparatus accommodated in a first wireless communication system of a wireless communication system that combines said first wireless communication system and a second wireless communication system, said first communication system performing a packet communication at a relatively high transmission rate by assigning communication resources to each communication terminal accommodated in said first communication system and by transmitting a transmit packet generated in accordance with the assignment to all communication terminals accommodated in said first communication system with same transmit power, said second wireless communication system performing a wireless communication at a lower transmission rate than said first wireless communication system, comprising:
an assignment section which, when said second wireless communication system issues an interruption request to a communication terminal that performs a packet communication in said first wireless communication system, modifies a priority of the communication terminal given the interruption request higher than when there is no interruption request and assigns communication resources, and
a transmit signal generation section that generates a transmit packet for a downlink channel in accordance with the assignment of communication resources by said assignment section.

2. The base station apparatus according to claim 1, wherein said assignment section performs the assignment of communication resources in a way that a transmission rate for data for the communication in respect to which an interruption request is made becomes higher than a when there is no interruption request.

3. The base station apparatus according to claim 2, comprising a detection section that detects channel quality with each of a plurality of communication terminals accommodated under said base station, wherein said assignment section comprises:
a provisional assignment circuit that assigns a higher priority in descending order of channel quality detected in said detection section and assigns communication resources to each of said plurality of communication terminals accordingly, and
a reassignment circuit that, when there is an interruption request from said second wireless communication system, modifies priority of the communication terminal in respect to which an interruption request is made higher than it was set when provisional communication resources were assigned, and assigns communication resources again.

4. The base station apparatus according to claim 3, wherein said assignment section modifies the number of transmit slots to assign to data for the communication terminal in respect to which an interruption request is made larger than when there is no interruption request.

5. The base station apparatus according to claim 3, wherein said assignment section modifies a coding rate whereby data for the communication terminal in respect to which an interruption request is made coded lower than when there is no interruption request.

6. The base station apparatus according to claim 3, wherein a modulation level number upon a modulation of the data for the communication terminal in respect to which an interruption request is made higher than when there is no interruption request.

7. The base station apparatus according to claim 3, wherein, upon executing spreading processing on data for the communication terminal in respect to which an interruption request is made, said assignment section modifies a spreading factor lower than when there is no interruption request.

8. A communication terminal, accommodated in a wireless communication system that combines a first wireless communication system and a second wireless communication system, said first communication system performing a packet communication at a relatively high transmission rate by assigning communication resources to each communication terminal accommodated in said first communication system and by transmitting a transmit packet generated in accordance with the assignment to all communication terminals accommodated in said first communication system with same transmit power, said second wireless communication system performing a wireless communication at a lower transmission rate than said first wireless communication system, comprising:
a selection section that, when there is an interruption request from said second wireless communication system before packet communication under said first wireless communication is complete, selects a communication mode whereby the transmission rate of the data for said communication terminal in said first wireless communication system is modified higher than when there is no interruption request, and
a transmission section that transmits to said first wireless communication system a data rate control signal that denotes the selected communication mode.

9. A wireless communication system that combines a first wireless communication system and a second wireless communication system, said first communication system performing a packet communication at a relatively high transmission rate by assigning communication resources to each communication terminal accommodated in said first communication system and by transmitting a transmit packet generated in accordance with the assignment to all communication terminals accommodated in said first communication system with same transmit power, said second wireless communication system performing a wireless communication at a lower transmission rate than said first wireless communication system, wherein:
when said second wireless communication system issues an interruption request to a communication terminal that performs a packet communication in said first wireless communication system, priority of the communication terminal in respect to which an interruption request is made is modified higher than when there is no interruption request and communication resources are assigned accordingly, and a transmit packet for a downlink channel is generated in accordance with the assigned communication resources.

10. A wireless communication system that combines a first wireless communication system and a second wireless communication system, said first communication system performing a packet communication at a relatively high transmission rate by assigning communication resources to each communication terminal accommodated in said first communication system and by transmitting a transmit packet generated in accordance with the assignment to all communication terminals accommodated in said first communication system with same transmit power, said second wireless communication system performing a wireless communication at a lower transmission rate than said first wireless communication system, wherein:

when said second wireless communication system issues an interruption request to a communication terminal that performs a packet communication in said first wireless communication system, said first wireless communication system suspends communication with the communication terminal in respect to which an interruption request is made, while said second wireless communication system starts communication with the communication terminal, and after communication under said second wireless communication system is complete, said first wireless communication system resumes packet communication with the communication terminal in respect to which an interruption request is made and transmits only the data that was unsent when packet transmission was suspended in packet transmission.

11. A wireless communication system that combines a first wireless communication system and a second wireless communication system, said first communication system performing a packet communication at a relatively high transmission rate by assigning communication resources to each communication terminal accommodated in said first communication system and by transmitting a transmit packet generated in accordance with the assignment to all communication terminals accommodated in said first communication system with same transmit power, said second wireless communication system performing a wireless communication at a lower transmission rate than said first wireless communication system, wherein:

when said second wireless communication system issues an interruption request to a communication terminal that performs a packet communication in said first wireless communication system, said first wireless communication system suspends packet communication with the communication terminal in respect to which an interruption request is made, and said second wireless communication system starts a service for the communication terminal in respect to which an interruption request is made, and the data for the communication terminal in respect to which an interruption request is made held by said first wireless communication system is inserted into an empty slot on a wireless channel assigned to said second wireless communication system and transmitted.

12. A wireless communication system that combines a first wireless communication system and a second wireless communication system, said first communication system performing a packet communication at a relatively high transmission rate by assigning communication resources to each communication terminal accommodated in said first communication system and by transmitting a transmit packet generated in accordance with the assignment to all communication terminals accommodated in said first communication system with same transmit power, said second wireless communication system performing a wireless communication at a lower transmission rate than said first wireless communication system, wherein:

when there is a call for a first communication terminal performing packet communication under said first wireless communication system from a second communication terminal that is not the same as the first communication terminal, under said second wireless communication system, a finishing time for the high-speed packet communication is calculated and said second communication terminal is informed of the calculated finishing time.

* * * * *